United States Patent [19]
Kim

[11] Patent Number: 6,163,450
[45] Date of Patent: Dec. 19, 2000

[54] PORTABLE COMPUTER WITH STRAP CONNECTORS

[75] Inventor: Young-Won Kim, Seoul, Rep. of Korea

[73] Assignee: SamSung Electronics Co. Ltd., Suwon, Rep. of Korea

[21] Appl. No.: 09/047,520

[22] Filed: Mar. 25, 1998

[30] Foreign Application Priority Data

Mar. 25, 1997 [KR] Rep. of Korea ........................ 97-10228

[51] Int. Cl.[7] .................................. G06F 1/16; H05K 5/00
[52] U.S. Cl. ........................ 361/679; 361/683; 248/188.4; 224/614; 224/616; 224/615; 174/50
[58] Field of Search ..................................... 361/683, 600, 361/641, 679; 248/688, 188.1, 188.4; 224/614, 615, 616, 930, 257; 174/50; 292/DIG. 30; 294/145

[56] References Cited

U.S. PATENT DOCUMENTS

| | | | |
|---|---|---|---|
| 1,060,257 | 4/1913 | Humphrey | 224/614 |
| 2,394,782 | 2/1946 | Kalske | 224/614 |
| 4,402,441 | 9/1983 | Jones . | |
| 4,715,293 | 12/1987 | Cobbs | 224/930 |
| 5,100,098 | 3/1992 | Hawkins . | |
| 5,158,257 | 10/1992 | Wilson . | |
| 5,160,001 | 11/1992 | Marceau | 109/102 |
| 5,186,375 | 2/1993 | Plonk | 224/930 |
| 5,379,057 | 1/1995 | Clough et al. | 364/705.06 |
| 5,430,607 | 7/1995 | Smith | 361/683 |
| 5,494,157 | 2/1996 | Golenz et al. . | |
| 5,570,780 | 11/1996 | Miller . | |
| 5,639,004 | 6/1997 | Calton et al. | 224/930 |
| 5,647,484 | 7/1997 | Fleming | 190/109 |
| 5,666,265 | 9/1997 | Lutz et al. | 361/683 |
| 5,667,114 | 9/1997 | Bourque | 224/257 |
| 5,678,666 | 10/1997 | Shyr et al. | 190/108 |
| 5,713,548 | 2/1998 | Boyer et al. . | |
| 5,724,225 | 3/1998 | Hrusoff et al. . | |
| 5,762,250 | 6/1998 | Clarton et al. | 224/930 |

FOREIGN PATENT DOCUMENTS

0555106A1 11/1993 European Pat. Off. .
6-274456 9/1994 Japan .

*Primary Examiner*—Gerald Tolin
*Assistant Examiner*—Lisa Lee-Edmonds
*Attorney, Agent, or Firm*—Robert E. Bushnell, Esq.

[57] ABSTRACT

A portable computer is provided that has a monitor pivotally mounted onto a main body. The base of the main body have holes that can receive a fastener. On the sides of the main body are receptacles that are positioned near a corresponding hole in the base of the main body of the computer.

An L-shaped member forms a connector that allows a strap to be attached to the portable computer to allow the computer to be more easily transported. The L shaped member has a bore on one leg and a boss on the other leg. To attach the connector the boss is inserted into a receptacle in the side of the main body and the bore of the connector is aligned over a hole in the base of the main body. Then, a fastener is inserted through the bore and into the hole in the base of the main body.

On a portion of the connector is a bail shaped member that forms a chute between the member and the connector. A strap can be attached to the bail shaped member to simplify the transporting of the portable computer. Additionally, the bail shaped member can be used to tilt the portable computer up at an angle more convenient for use by a user.

With the connectors of the present invention it is possible to more quickly ready a portable computer for transport and possible to eliminate the need for a separate tilting device. Additionally, by looping the strap around one's neck, a user can use the portable computer while walking without fear of dropping the computer. This design is ideal for operating the portable computer while performing multiple short distance moves. If a user is in a hurry, the strap need not be removed during use and the portable computer can simply be slung over a shoulder when quick movement is again required.

22 Claims, 6 Drawing Sheets

PORTABLE COMPUTER WITH STRAP CONNECTORS

CLAIM OF PRIORITY

This application makes reference to, incorporates the same herein, and claims all benefits accruing under 35 U.S.C. § 119 from my application entitled Portable Computer earlier filed in the Korean Industrial Property Office on the Mar. 25, 1997, and there duly assigned Ser. No. 97-10228 by that Office.

BACKGROUND OF THE INVENTION

1. Field of the Invention

The present invention relates to a portable computer and, more specifically, to a device that allows a portable computer to either be tilted or more easily transported.

2. Background Art

Microcomputers, such as portable computers and notebook computers, are relatively heavy and expensive, and can contain vast amounts of information that is vital to business and industry. Certain portions of portable computers are subject to damage from impact, for example, hard disk drives and liquid crystal displays. Thus, great effort has been expended to insulate portable computers from impact when being transported and to create containers for transporting the computers.

One of the greatest utilities of a notebook computer is its portability and simplicity of transport. Some techniques and devices for transporting portable computers are shown, for example, in U.S. Pat. No. 5,494,157 to Golenz entitled Computer Bag With Side Accessible Padded Compartments, U.S. Pat. No. 5,713,548 to Boyer entitled System for Retaining a Computer or Other Article on the Human Body, U.S. Pat. No. 4,715,293 to Cobbs entitled Body-Supported Hand-Operated Instrument Desk, U.S. Pat. No. 4,402,441 to Jones entitled Musical Instrument Carrier, U.S. Pat. No. 5,724,225 to Hrusoff entitled Laptop Computer Carrying Tray, U.S. Pat. No. 5,667,114 to Bourque entitled Carrying Apparatus for a Portable Computer, U.S. Pat. No. 5,570,780 to Miller entitled Portable Computer Carrying Case, U.S. Pat. No. 5,100,098 to Hawkins entitled Stand and Handle for Hand Held Computer, and U.S. Pat. No. 5,158,257 to Wilson entitled Portable Keyboard Support. The contemporary art provides many cases for the transport of portable computers but all the methods take time to pack away the portable computer or attach it to a device used for transport. Thus, the effective transportation of the portable computer or notebook consumes time to ensure that the computer is not exposed to undue risk of damage. By way of example, a typical portable computer uses a bag that is opened or closed with a zipper. Whenever the portable computer is to be transported, the bag must be opened, the computer must be secured inside the bag, and then the bag has to be closed prior to transporting the document. This wastes time and adds inconvenience to one who needs to transport a portable computer often. Additionally, the contemporary portable computers can be difficult to carry due to how easy it is for a portable computer to slip out of a user's grip. Furthermore, the portable computer can be easily damaged while being carried by being bumped into objects.

As such, I believe it may be possible to improve on the contemporary art by providing a portable computer that is easy to transport without an additional case or bag, that eliminates the need for a separate tilting device, that does not hinder a user's freedom of movement or agility during transport, that is easy for a user to grip, and that can easily be attached or detached from a strap connector.

SUMMARY OF THE INVENTION

Accordingly, it is an object of the present invention to provide a portable computer that is easier to transport without devoting time to packing the computer in a case or a bag.

It is another object to provide a portable computer that eliminates the need for a separate tilting device.

It is still another object to provide a portable computer that is easy for a user to control while transporting the computer.

It is yet another object to provide a portable computer that can easily be detached or attached to a strap connector.

It is still yet another object to provide a portable computer that can be quickly and safely transported through multiple successive moves without hindering the movement or agility of the user.

To achieve these and other objects, a portable computer is provided that has a monitor pivotally mounted onto a main body. The base of the main body have holes that can receive a fastener. On the sides of the main body are receptacles that are positioned near a corresponding hole in the base of the main body of the computer.

An L-shaped member forms a connector that allows a strap to be attached to the portable computer to allow the computer to be more easily transported. The L shaped member has a bore on one leg and a boss on the other leg. To attach the connector the boss is inserted into a receptacle in the side of the main body and the bore of the connector is aligned over a hole in the base of the main body. Then a fastener is inserted through the bore and into the hole in the base of the main body of the portable computer.

On a portion of the connector is a bail shaped member that forms a chute between the member and the connector. A strap can be attached to the bail shaped member to simplify the transporting of the portable computer. Additionally, the bail shaped member can be used to tilt the portable computer up at an angle more convenient for use by a user.

With the connectors of the present invention it is possible to more quickly ready a portable computer for transport and possible to eliminate the need for a separate tilting device.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE DRAWINGS

Figure 1:
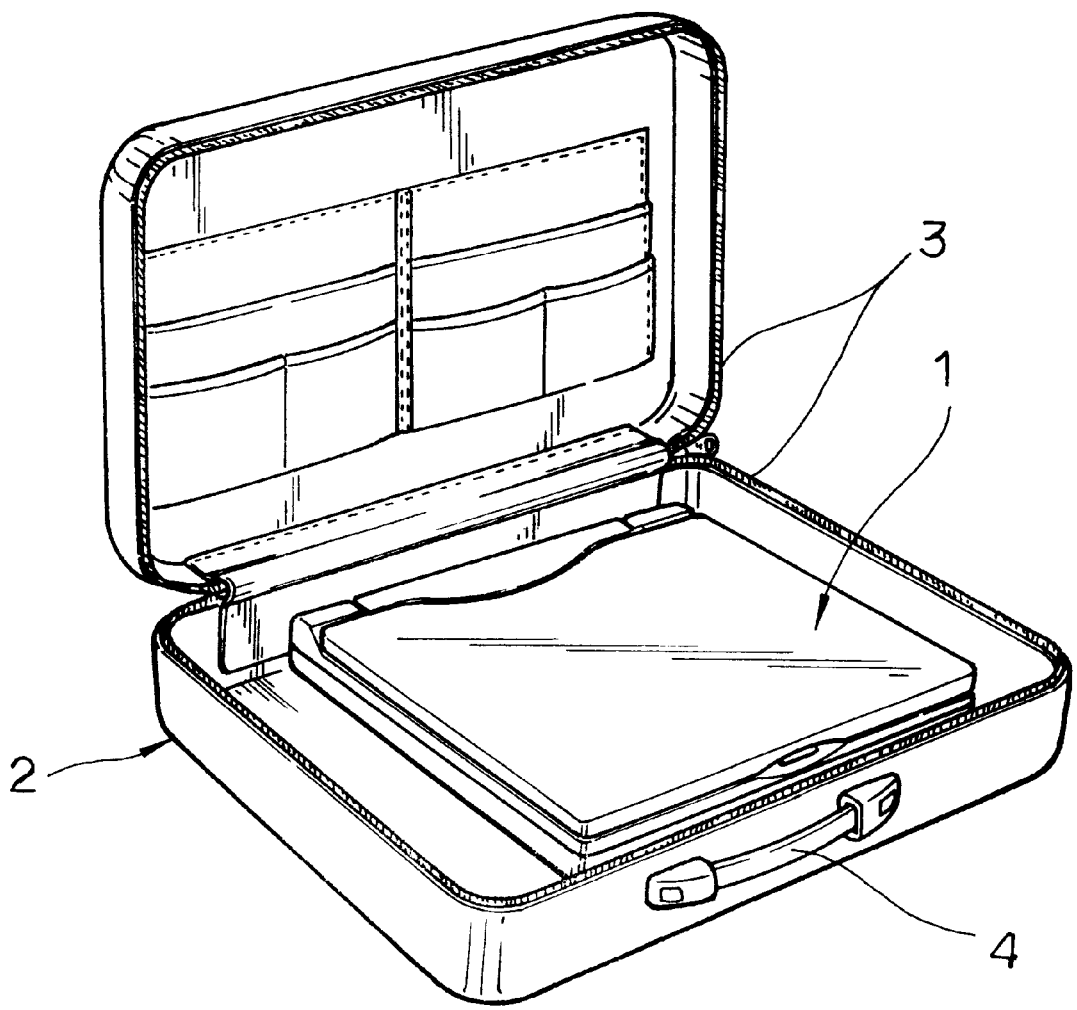
FIG. 1 is a perspective view of a portable computer and a carrying case.

Turning now to the drawings, FIG. 1 illustrates a portable computer, or notebook computer, and a carrying case. Carrying case 2 is opened and closed using zipper 3 and hand grip 4 is used to hold and carry portable computer 1 when the computer is packed in carrying case 2. To safely and effectively transport portable computer 1, the computer must be packed inside of carrying case 2 and the case has to be closed via zipper 3.

Figure 2:
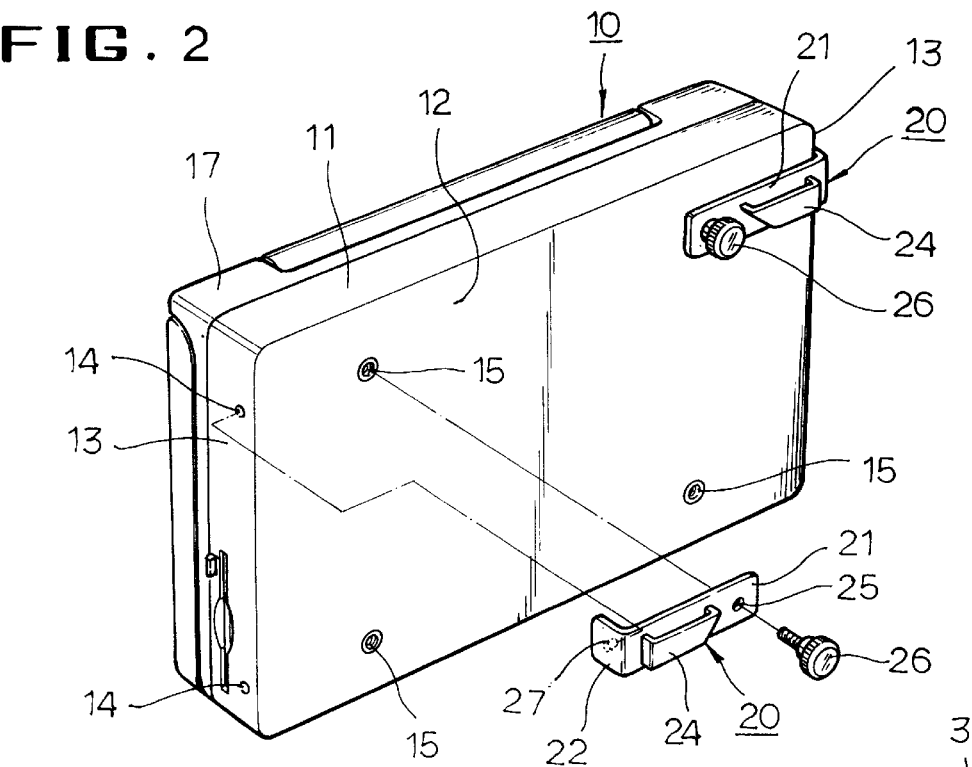
FIG. 2 is an exploded perspective view of salient components of a portable computer as constructed according to the principles of the present invention.

FIG. 2 illustrates portable computer 10 as constructed according to the principles of the present invention. The portable computer may be constructed with connector 20 that can be either mounted or detached from the computer. Connector 20 is formed by leg members 21 and 22 that are joined along a common edge to form an L-shaped member. Leg member 22 has inwardly facing boss 27 and leg member 21 has bore 25, both of which are used to secure connector 20 to portable computer 10. To attach connector 20 to portable computer 10, boss 27 is inserted into receptacle 14 in side 13 of main body 11. Then bore 25 in leg member 21 is aligned over hole 15 in base 12 of main body 11 and fastener 26 is inserted through bore 25 and into hole 15. Fastener 26 can be any one of a screw, a rivet and a bolt. Alternatively, adhesive, glue, or Velcro can be used instead of a fastener to attach connector 20 to the portable computer. Projecting outward from leg member 21 is bail-shaped member 24 that forms chute 23 between the bail shaped member and leg member 21.

Figure 3:
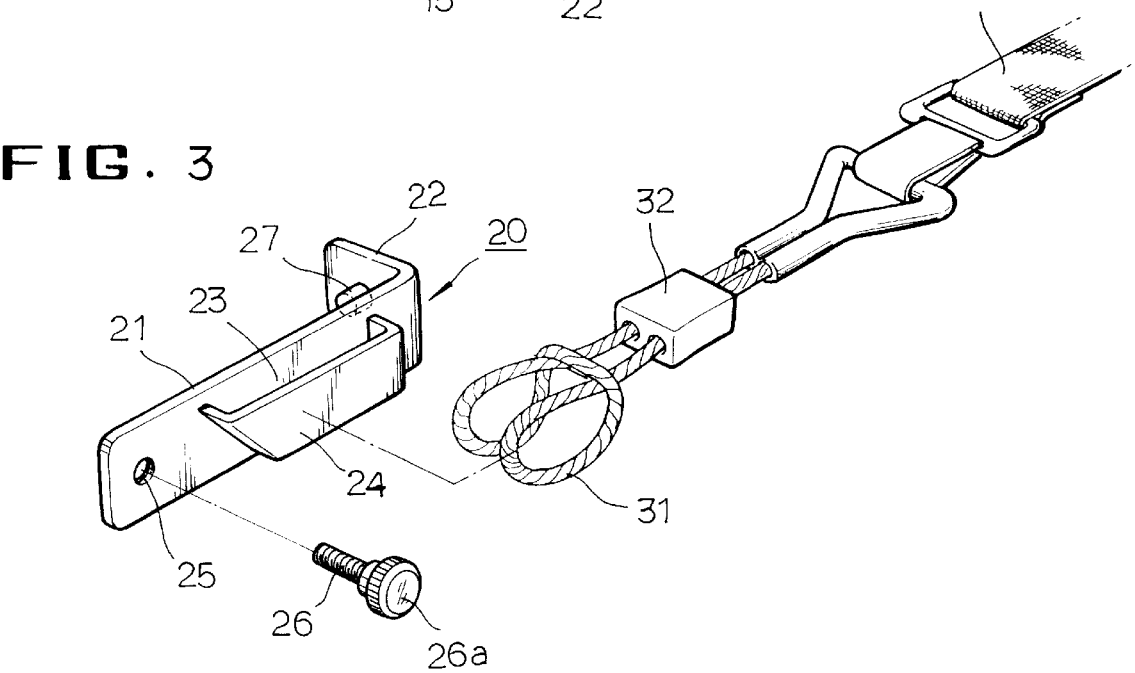
FIG. 3 is a perspective view of the connector and the strap used with the portable computer of FIG. 2.

As shown in FIG. 3, a strap can be connected to the bail shaped member by looping a portion of carry strap 30 around the bail-shaped member and through chute 23. Because main body 11 is made out of plastic, it is necessary to reinforce hole 15 with a metallic or a composite bushing 16, as shown in FIG. 5.

Carry strap 30 has cord 31 at both ends that can be inserted into chute 23 of connector 20 and secured to bail-shaped member 24. Cord 31 is tightened into place using sliding drum 32. Carry strap 30 can be made of any design. The example detailed here is not pertinent to the invention and is provided only as an example of one type of strap. Cord 31 for coupling with connector 20 should be flexible and easy to insert into chute 23 of connector 20. Furthermore, by constructing cord 31 out of synthetic fiber, the frictional contact between the cord and main body 11 is lowered to avoid generating abrasions or damaging main body 11. An alternative embodiment for securing a carrying strap to the connector is using a plastic or composite snap ring.

Figure 4:
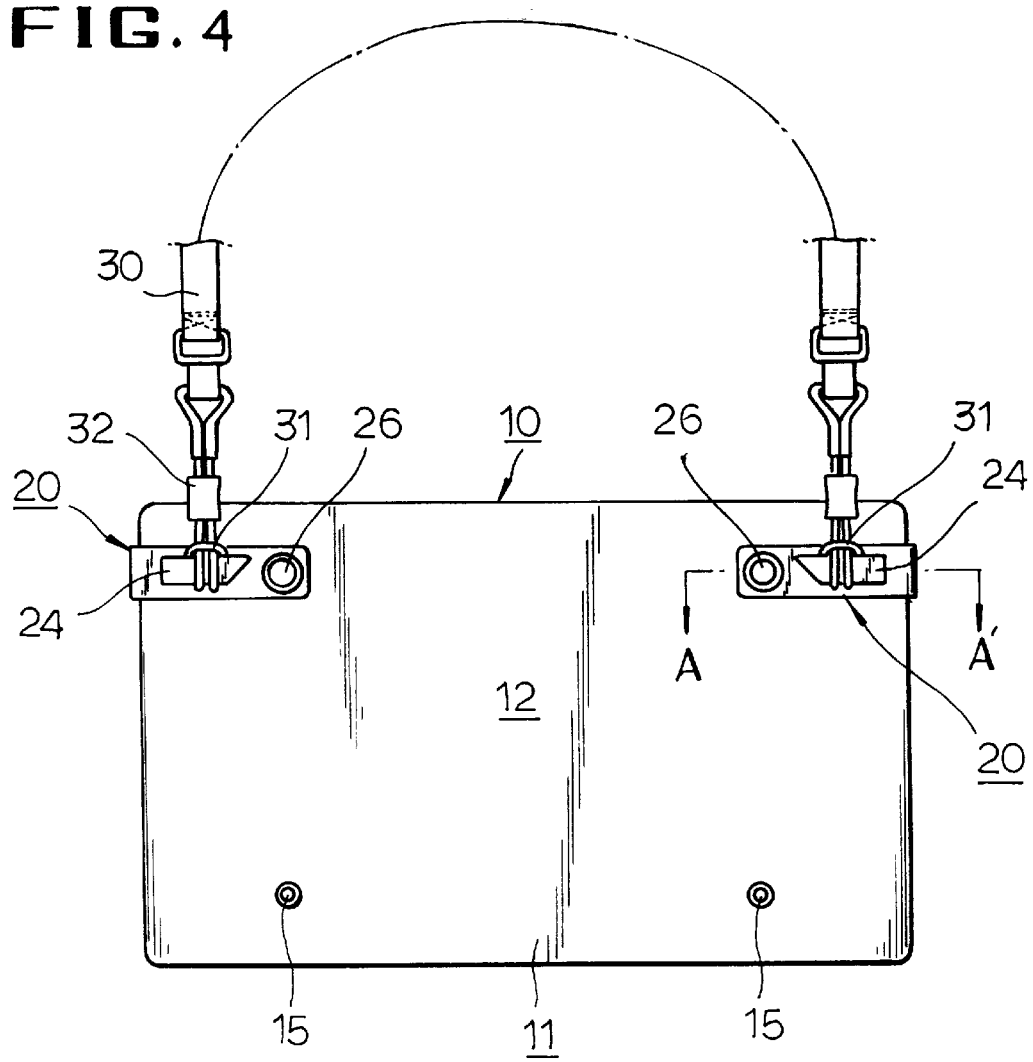
FIG. 4 is a bottom view of the portable computer of FIG. 2 illustrating two connectors securing a strap to the computer.

FIG. 4 shows portable computer 10 configured for convenient carrying. Connectors 20 are aligned laterally with each other to secure distal ends of carrying strap 30. This design is ideal for multiple short distance moves. If a user is in a hurry, the strap need not be removed during use and the portable computer can simply be slung over a shoulder when quick movement is again required. The line A–A' is shown in cross section in FIG. 5.

Figure 5:
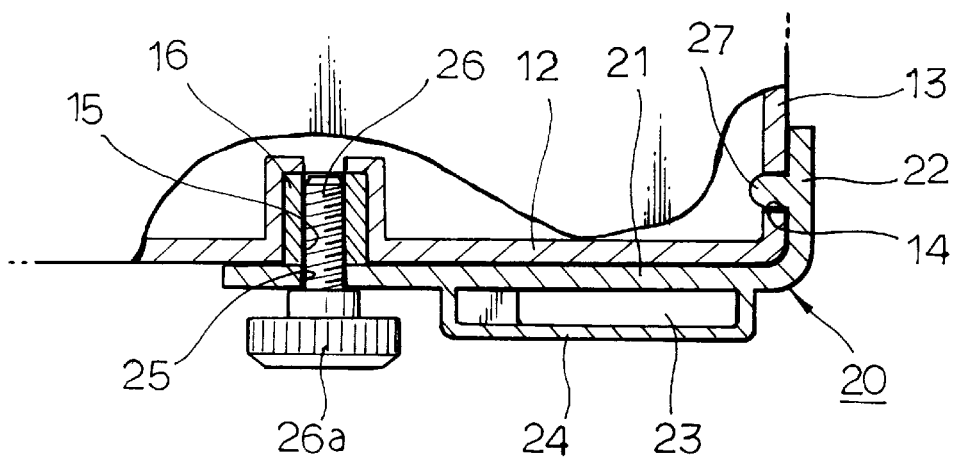
FIG. 5 is an exploded cross-sectional view taken along the line A–A1 illustrating the interaction between the connector and the main body of the portable computer of FIG. 4.
Figure 7:
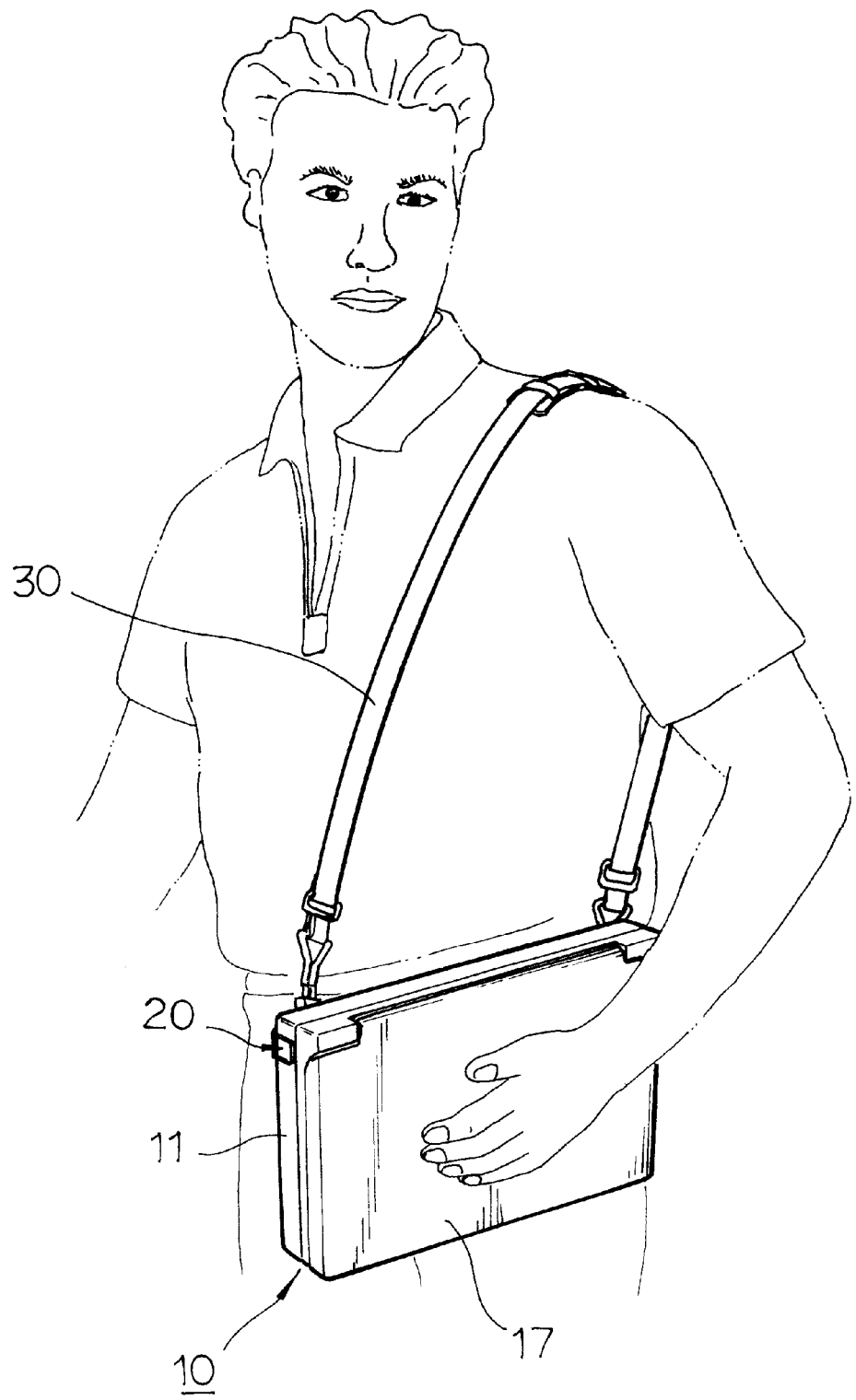
FIG. 7 is a perspective view of a the portable computer of FIG. 2 being carried using the strap and the connectors.

The interactions between connector 20 and portable computer 10 are shown in FIG. 5. When connector 20 is mounted to main body 11, boss 27 or leg member 22 is engaged with receptacle 27 and leg member 21 is fastened to hole 15 in base 12 of main body 11. To fasten leg member 21 to main body 11, fastener 26 is inserted through bore 25 of leg member 21 and inserted into hole 15 in main body 11. Hole 15 has reinforcing bushing 16 that mates with fastener 26. Bushing 16 may be made of a composite or metallic material that has better wear properties than the plastic used to form the main body of the portable computer. Carry strap 30 is attached to bail-shaped member 14 by cord 31 to allow a user to carry the computer over a shoulder, as shown in FIG. 7.

Figure 6:
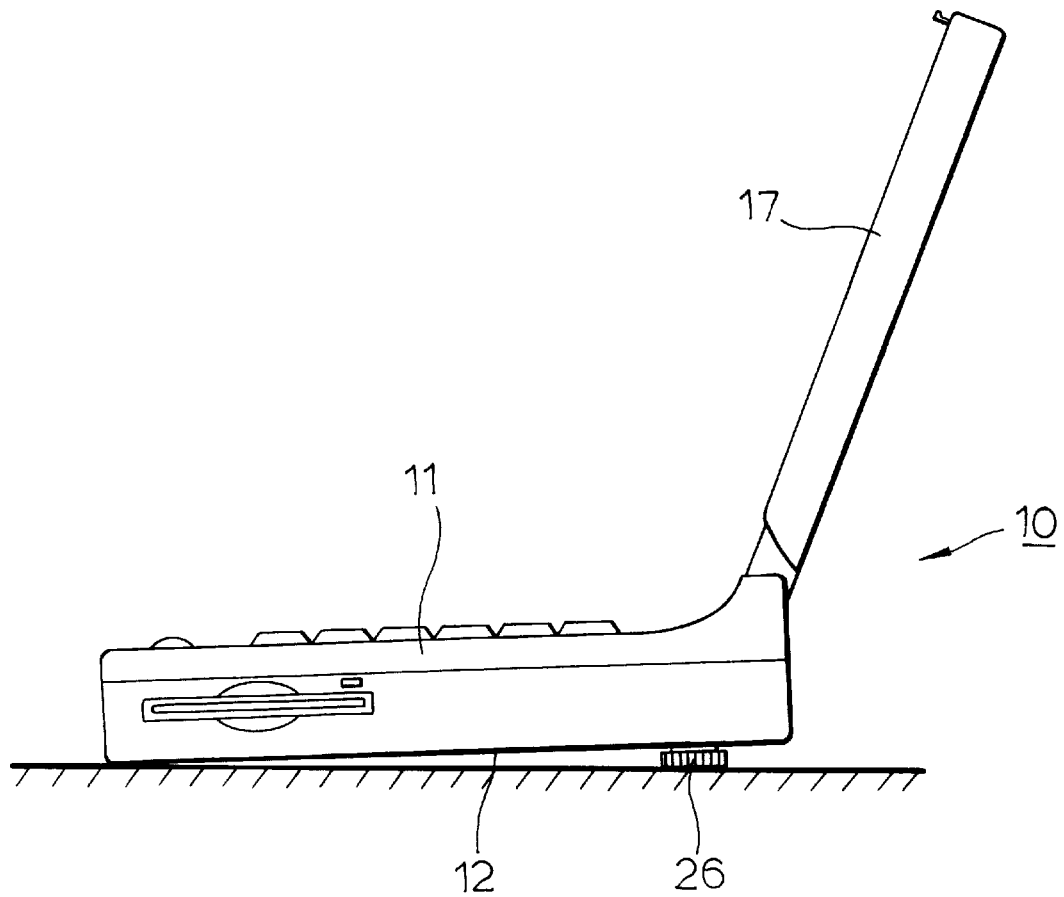
FIG. 6 is a side view of the portable computer of FIG. 2 illustrating how the connector as constructed according to the principles of the present invention can also serve as a tilting device to raise the rear portion of the portable computer.

As shown in FIG. 6, portable computer 10 does not require a separate tilting device. By leaving connectors 20 in base 12 of main body 11, the computer has its rear portion raised to simplify the operation of the keyboard for a user. When portable computer 10 is in a tilted position, the outer surface of connector 20 is in contact with a supporting surface. Alternatively, the portable computer can be held in a tilted configuration by fastening screws 26 that may be used without the use of connector 20.

Figure 8:
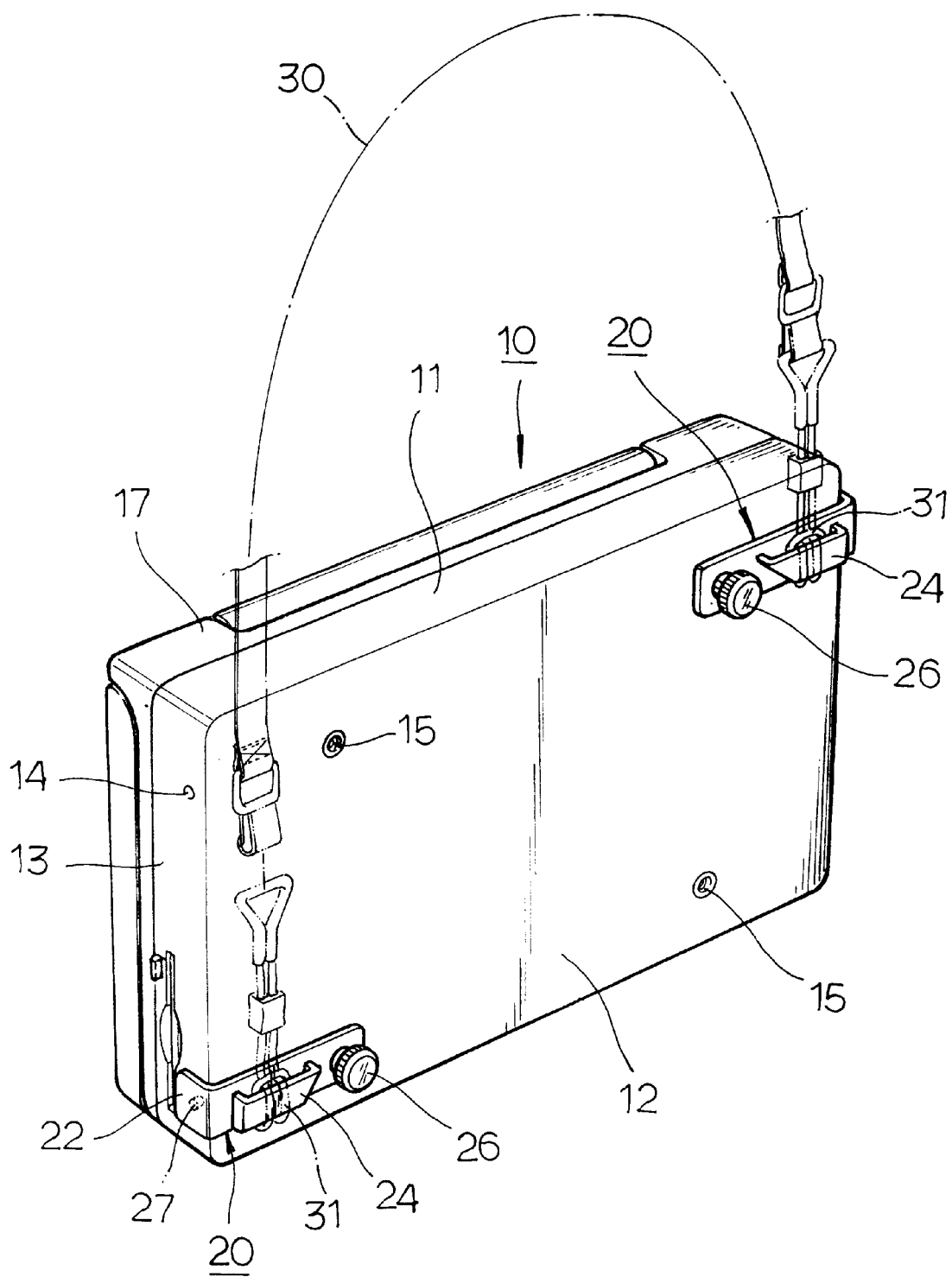
FIG. 8 is a perspective view of the portable computer of FIG. 2 illustrating another one of many ways that the strap can be attached to the computer using the connectors.

While transporting the computer with the straps attached to two horizontally aligned connectors is preferable, FIG. 8 illustrates that any combination of connector positions can be used to secure carrying strap 30 to the computer. The actual orientation of the connectors is only governed by the user's taste. The present invention enables portable computers to be supported by a user's shoulder during transport, thus increasing the portability of the laptop. Additionally, by looping the strap around one's neck, a user can use the portable computer while walking without fear of dropping the computer.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. For example the word "fastener" as used in both the specifications and the claims should be understood as meaning any of "screw, bolt, rivet, Velcro, adhesive, or glue." It is also possible that other benefits or uses of the currently disclosed invention will become apparent over time.

What is claimed is:

1. A portable computer, comprising:
   a main body having a rectangular shape, a base, four sides, and a receptacle in one side, said main body having a keyboard, a memory and a central processing unit;
   a cover pivotally connecting to said main body and supporting a variable visual display unit driven by said central processing unit;
   a connector being attachable to said main body, comprising:
      an L-shaped member contacting both said base and one side of said main body;
      a boss being engageable with said receptacle in said main body;
      a bore being penetrated by a fastener that is inserted into said base of said main body; and
      a handle forming a chute between said handle and said L-shaped member;
   said connector being attachable to said main body by inserting said boss of said connector into said receptacle of said main body and inserting a fastener through said bore in said connector and into said main body of said portable computer; and a shoulder strap being attachable to said handle of said connector.

2. The portable computer of claim 1, further comprised of said main body having four of said receptacle.

3. The portable computer of claim 2, further comprised of at least two of said connector being attached to said portable computer.

4. The portable computer of claim 3, further comprised of said fastener corresponding to any one of a bolt, rivet, and a screw.

5. The portable computer of claim 4, further comprised of said base of said main body having a hollow to receive said fastener after said fastener is inserted through said bore in said connector, said hollow having a bushing to improve the wear properties of said main body.

6. The portable computer of claim 1, further comprised of said connector being usable as a tilting device to support said portable computer at an angle relative to a surface supporting said portable computer.

7. An electrical apparatus, comprising:

a main body having a rectangular shape, a base, four sides, and a receptacle in one side, said main body housing a plurality of circuitry;

a connector being attachable to said main body, comprising:

an L-shaped member contacting both said base and one side of said main body;

a boss being engageable with said receptacle in said main body;

a bore being penetrated by a fastener that is inserted into said base of said main body; and a handle forming a chute between said handle and said L-shaped member; and a shoulder strap being attachable to said handle of said connector.

8. The electrical apparatus of claim 7, further comprised of said electrical apparatus being a portable computer, said main body having a keyboard, a memory and a central processing unit; and a cover pivotally connecting to said main body and supporting a variable visual display unit driven by said central processing unit.

9. The electrical apparatus of claim 7, further comprised of said connector being attachable to said main body by inserting said boss of said connector into said receptacle of said main body and inserting a fastener through said bore in said connector and into said main body of said electrical apparatus.

10. The electrical apparatus of claim 7, further comprised of said main body having four of said receptacle.

11. The electrical apparatus of claim 10, further comprised of at least two of said connector being attached to said electrical apparatus.

12. The electrical apparatus of claim 11, further comprised of said fastener corresponding to any one of a bolt, rivet, and a screw.

13. The electrical apparatus of claim 12, further comprised of said base of said main body having a hollow to receive said fastener after said fastener is inserted through said bore in said connector, said hollow having a bushing to improve the wear properties of said main body.

14. The electrical apparatus of claim 7, further comprised of said connector being usable as a tilting device to support said electrical apparatus at an angle relative to a surface supporting said electrical apparatus.

15. A portable computer, comprising:

a main body having a base, four sides and a receptacle formed in said main body, said main body having a keyboard, a memory and a central processing unit;

a cover pivotally connecting to said main body and supporting a variable visual display unit driven by said central processing unit;

a connector being attachable to said base of said main body said connector comprising:

a bent member contacting both said base and one side of said main body;

a boss being engageable with said receptacle of said main body;

a bore being penetrated by a fastener that s inserted into said base of said main body; and a handle forming a chute between said handle and said bent member, and a shoulder strap being attachable to said connector.

16. The portable computer of claim 15, with said main body further comprising said receptacle being positioned in one side to engage said connector.

17. The portable computer of claim 15, with said bent member comprising an L-shaped member.

18. The portable computer of claim 17, further comprised of said connector being attachable to said main body by inserting said boss of said connector into said receptacle of said main body and inserting a fastener through said bore in said connector and into said main body of said portable computer.

19. The portable computer of claim 18, further comprised of said base having four of both said hollow and said receptacle.

20. The portable computer of claim 19, further comprised of at least two of said connector being attached to said portable computer.

21. The portable computer of claim 18, further comprised of said connector being usable as a tilting device to support said portable computer at an angle relative to a surface supporting said portable computer.

22. The portable computer of claim 21, further comprised of said base of said main body having a hollow to receive said fastener after said fastener is inserted through said bore in said connector, said hollow having a bushing to improve the wear properties of said main body.

* * * * *